June 4, 1957   B. W. ROSE ET AL   2,794,421
CONVEYOR TYPE AUTOMATIC FEED TROUGH
Filed April 29, 1954   7 Sheets-Sheet 1
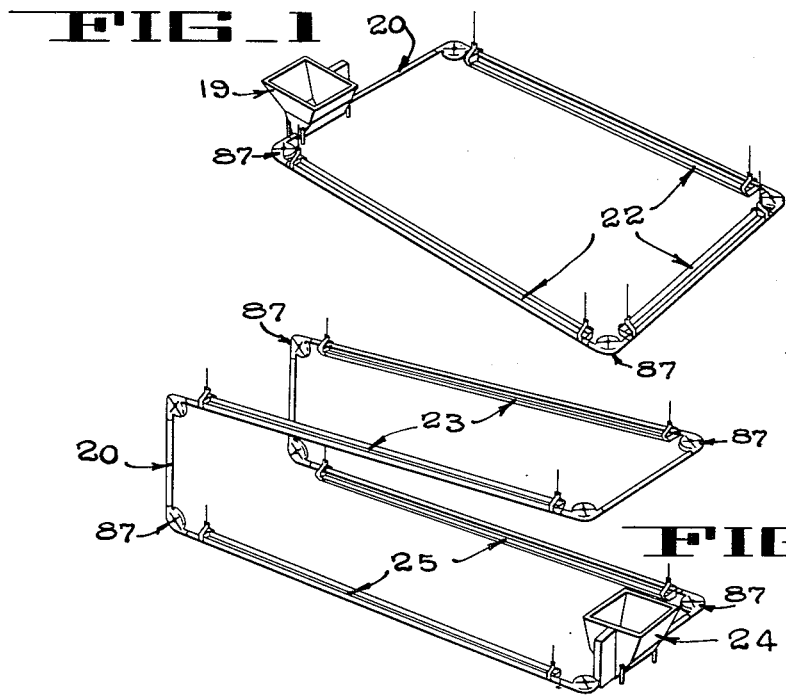
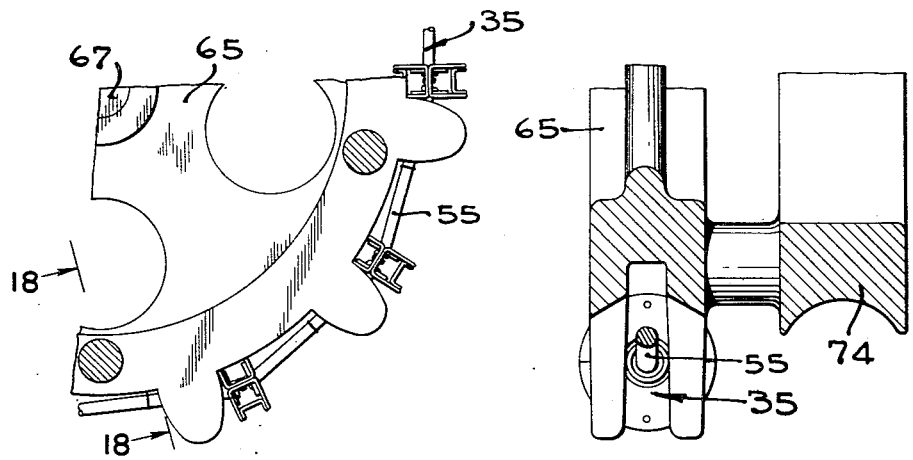
INVENTORS
HAROLD W. HART
BOYD W. ROSE
BY Hans G. Hoffmeister
ATTORNEY

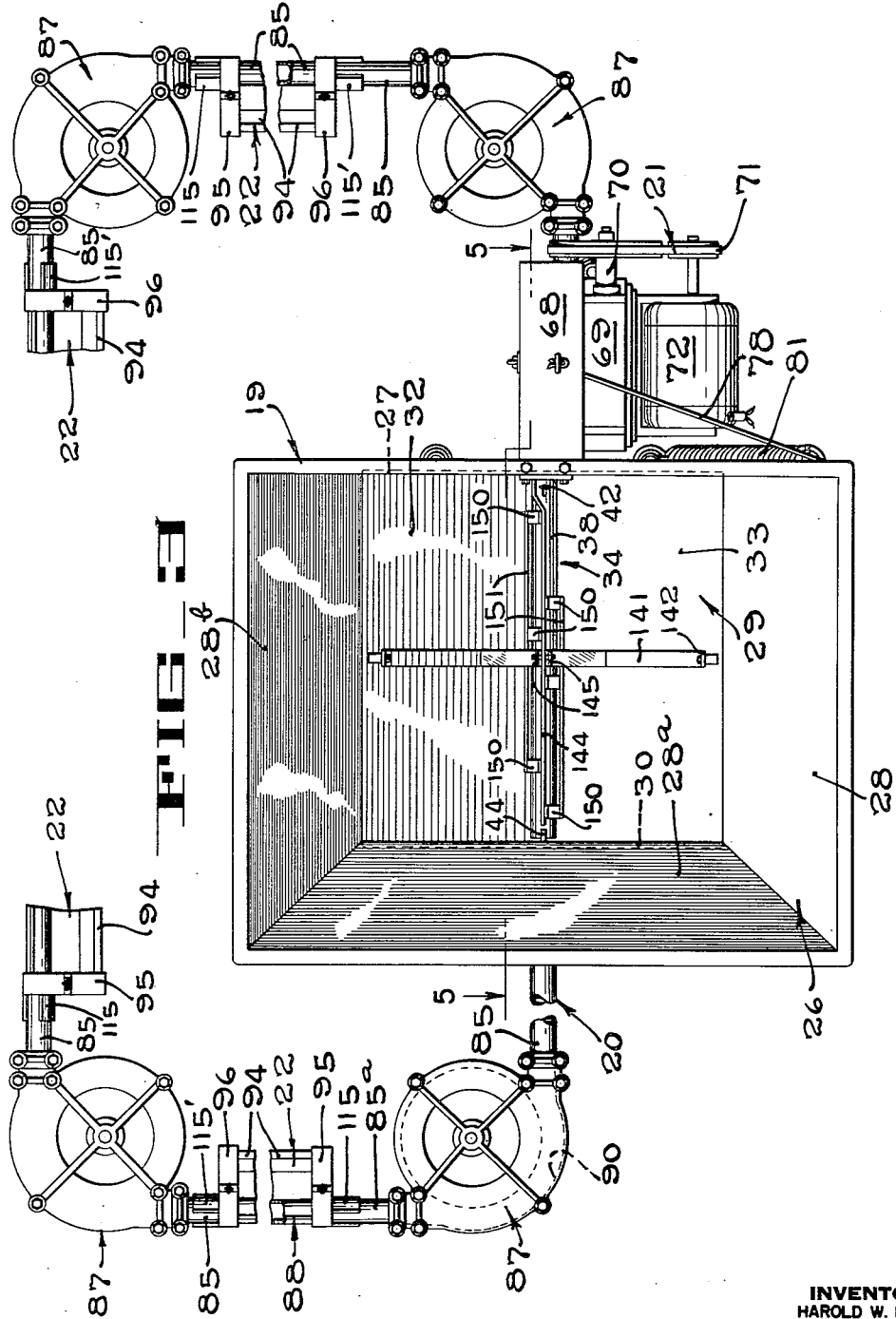

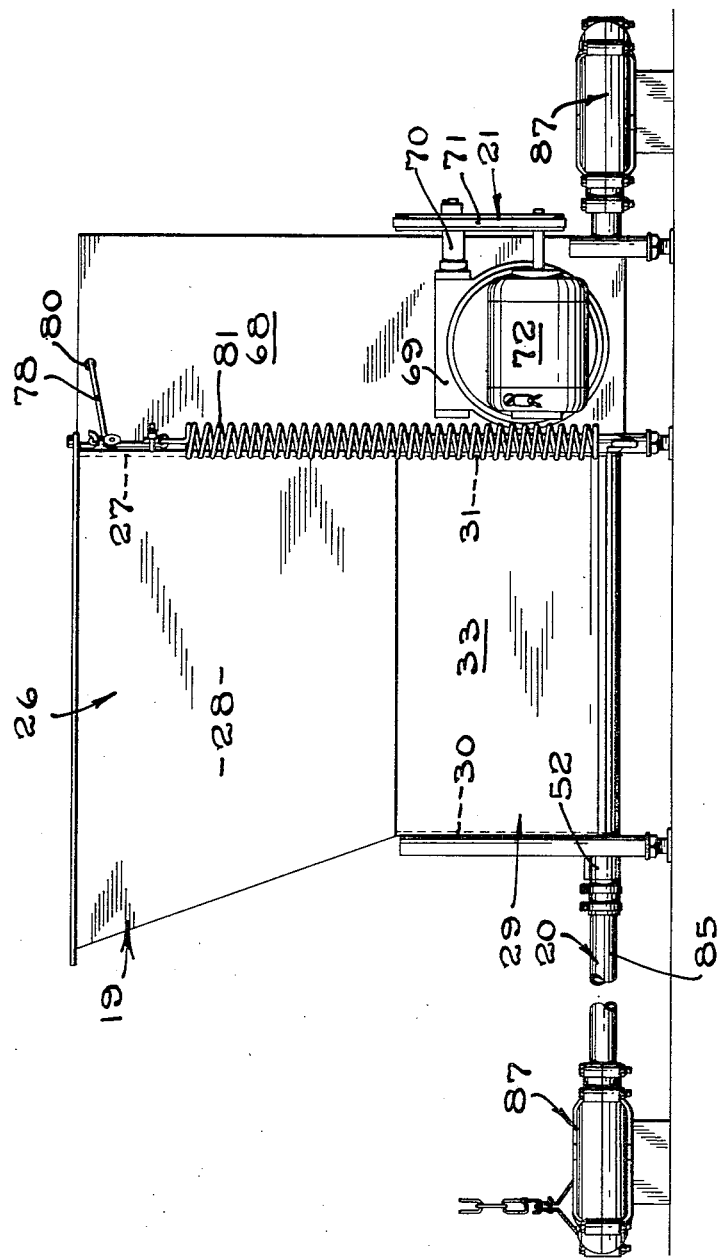

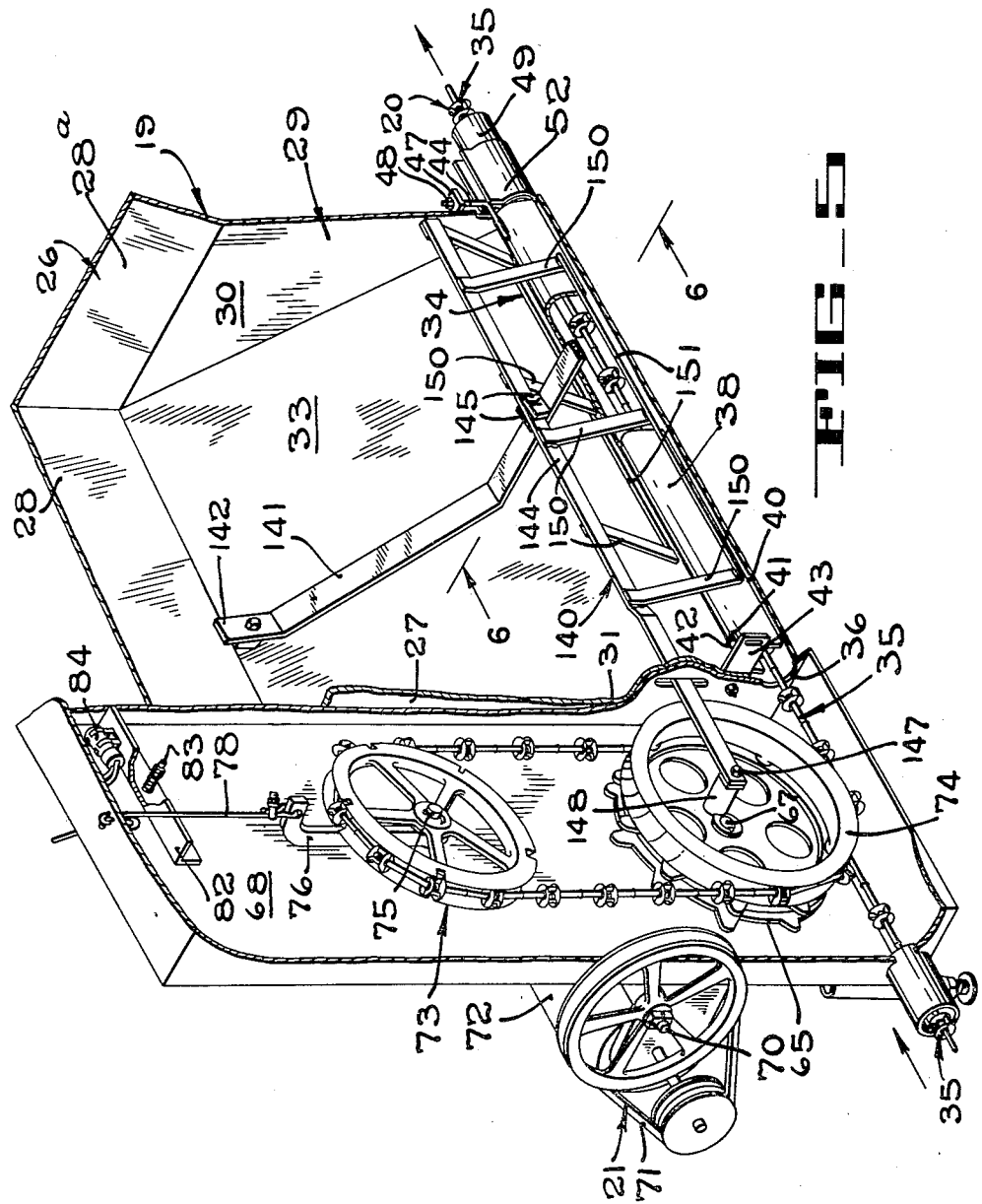

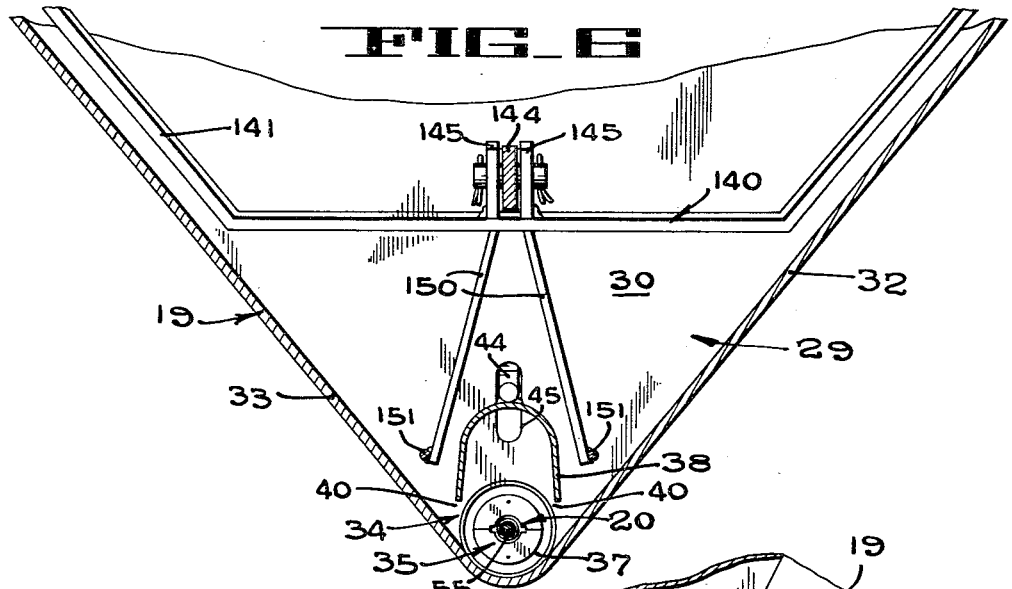
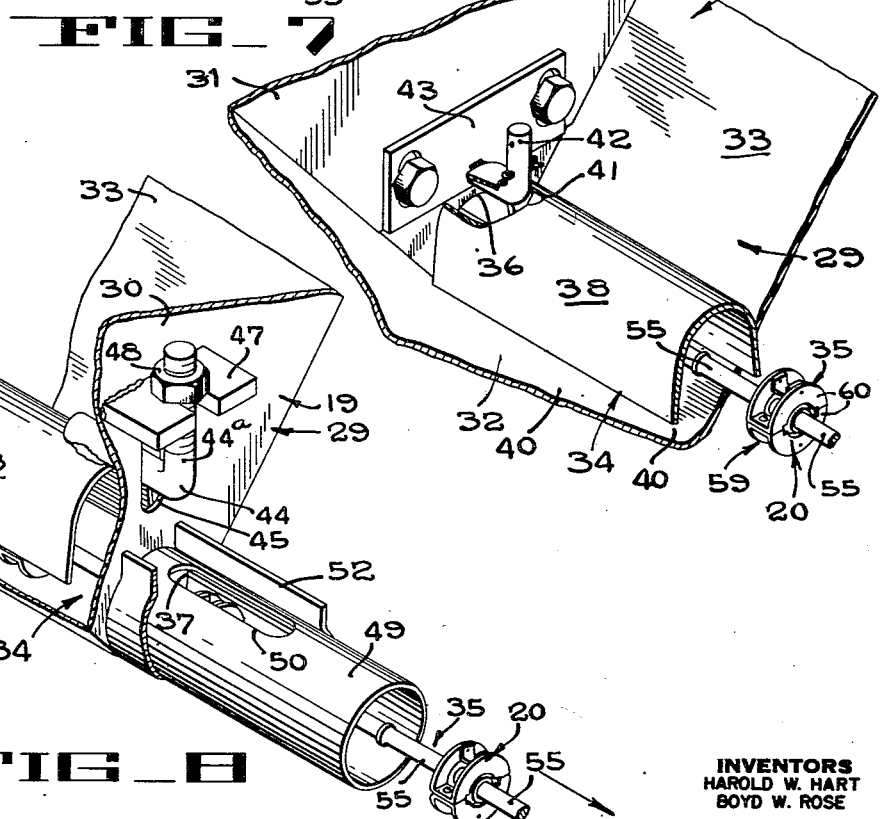

June 4, 1957  B. W. ROSE ET AL  2,794,421
CONVEYOR TYPE AUTOMATIC FEED TROUGH
Filed April 29, 1954  7 Sheets-Sheet 6
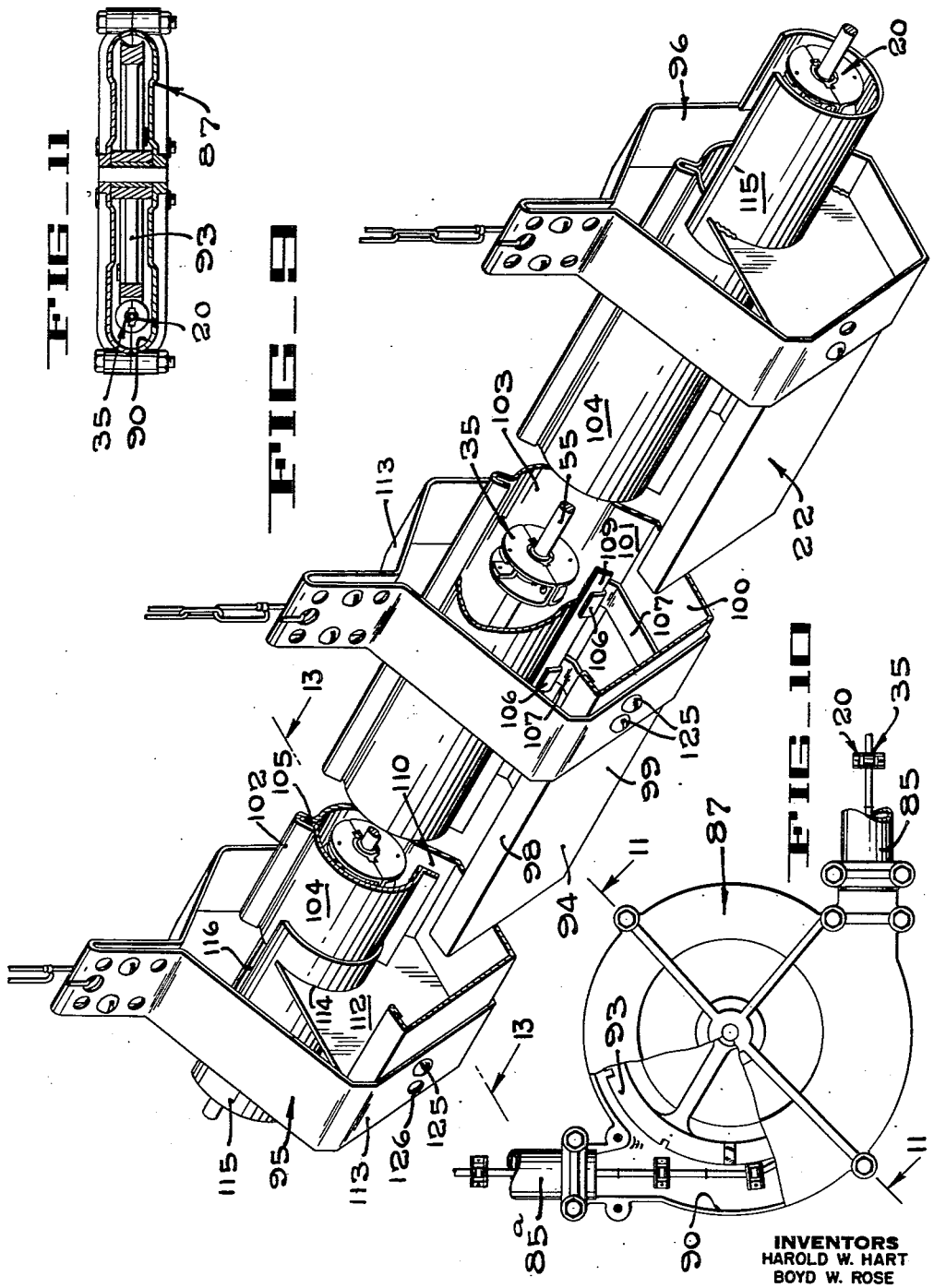
INVENTORS
HAROLD W. HART
BOYD W. ROSE
BY Hans G. Hoffmeister
ATTORNEY

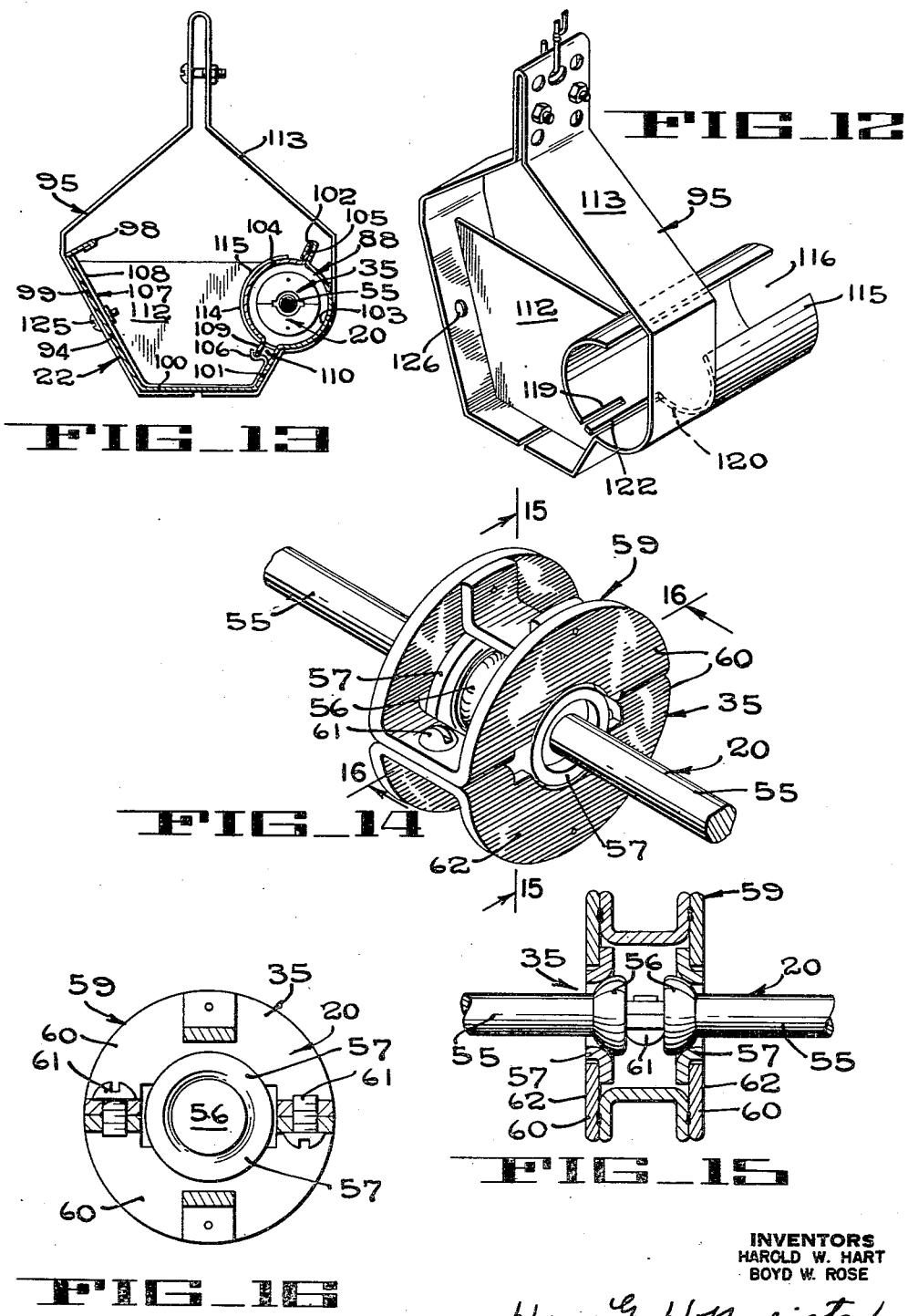

United States Patent Office 2,794,421
Patented June 4, 1957

2,794,421

CONVEYOR TYPE AUTOMATIC FEED TROUGH

Boyd W. Rose, Riverside, and Harold W. Hart, Glendale, Calif.; said Rose assignor to Food Machinery and Chemical Corporation, San Jose, Calif., a corporation of Delaware Application April 29, 1954, Serial No. 426,488

9 Claims. (Cl. 119—52)

This invention pertains to poultry feeding apparatus and more particularly to an improved poultry feeder for automatically taking mash, grain, pellets or other feed from a supply hopper and distributing it in and along one or more open feeding troughs so that the feed is available to the poultry.

It is an object of the present invention to provide a feeding trough of improved construction.

Another object is to provide a poultry feeder having means for maintaining a constant level of feed in the feeding troughs.

Another object is to provide a poultry feeder having means for controlling the rate at which feed is taken from a supply hopper and distributed to feeding troughs.

Another object is to provide a poultry feeding trough for use with an automatic feed conveying system, said trough having means for protecting the poultry from injury by the moving parts of the conveying system.

Other and further objects and advantages of the present invention will become apparent from the following detailed description taken in connection with the accompanying drawings, in which:

Fig. 1 is a schematic perspective of a poultry feeding system having a hopper and feeding troughs constructed in accordance with the teachings of the present invention.

Fig. 2 is a schematic perspective of a modified poultry feeding system particularly adapted for supplying feed to poultry in a multiple story poultry house.

Fig. 3 is a fragmentary plan, partly broken away, of the feeding system of Fig. 1, particularly showing the supply hopper and the drive mechanism for the feed distributing apparatus.

Fig. 4 is a side elevation of the feed hopper and connected apparatus shown in Fig. 3.

Fig. 5 is a fragmentary vertical section taken along line 5—5 of Fig. 3, and shown in perspective.

Fig. 6 is a fragmentary vertical section taken along line 6—6 of Fig. 5.

Fig. 7 is a fragmentary perspective of the portion of the supply hopper through which the conveyor mechanism enters the hopper.

Fig. 8 is a fragmentary perspective of the portion of the supply hopper at which the conveyor mechanism discharges feed from the supply hopper.

Fig. 9 is a fragmentary perspective of the fabricated trough used in the poultry feeder, with parts broken away to more clearly disclose the internal structure of the trough.

Fig. 10 is a plan, with parts broken away, of a turning elbow of the feed conveying system used with the present poultry feeder.

Fig. 11 is a vertical section taken along line 11—11 of Fig. 10.

Fig. 12 is a perspective of one end closure member of the feeding trough of Fig. 9.

Fig. 13 is a vertical section taken along line 13—13 of Fig. 9.

Fig. 14 is a fragmentary perspective of a portion of the conveying chain.

Fig. 15 is a section taken along line 15—15 of Fig. 14.

Fig. 16 is a section taken along line 16—16 of Fig. 14.

Fig. 17 is a fragmentary vertical section of the drive sprocket of the conveyor system, particularly showing the driving engagement of the teeth of the sprocket with the conveying chain.

Fig. 18 is a fragmentary section taken along lines 18—18 of Fig. 17.

In Fig. 1 the reference numeral 19 indicates generally a feed supply hopper from which poultry feed is taken by a conveyor 20 which is driven by a power drive mechanism 21. The conveyor 20 moves the feed in a circuitous path and delivers the feed to successive open top feeding troughs 22 disposed along the path. While only three feeding troughs 22 are illustrated in Fig. 1, it will be apparent that any desirable number of feeding troughs may be used within the limits dictated by the size of conveying unit and the power of the mechanism used to drive the conveying unit. In Fig. 2 an installation is shown wherein troughs 23 are disposed on an upper floor of a multiple story poultry house and are arranged to be supplied with feed from the same supply hopper 24 that supplies feed to troughs 25 on the main floor of the poultry house.

The supply hopper 19 (Figs. 3 and 4) is constructed of sheet steel and comprises an upper portion 26 having a vertical wall 27 and three inclined walls 28, 28a and 28b. The upper portion 26 communicates with a lower portion 29 that has vertical end walls 30 and 31, which are extensions of upper walls 28a and 27 respectively, and inclined side walls 32 and 33 (Fig. 6). Feed placed in the hopper will gravitate downwardly along the inclined walls 32 and 33 and accumulate in a pickup zone 34 (Fig. 6) at the lower end of the V formed by the walls. An endless chain 35 of the conveyor system 20 (to be described more fully hereinafter) enters the hopper 19 through an opening 36 (Fig. 7), travels through the feed in the pickup zone 34, and carries quantities of the feed out of the hopper through an opening 37 (Figs. 6 and 8). The rate at which feed leaves the hopper is controlled by a shield 38 (Figs. 7 and 8) which is of inverted U-shape and extends longitudinally in the hopper at the pickup zone 34.

The rate at which the feed moves down into the pickup zone may be controlled by regulating the size of the openings 40 (Fig. 6) between the lower side edges of the shield and the bottom wall of the hopper. For this purpose, each end of the shield is adjustably secured to an adjacent end wall of the hopper. At the inlet end of the hopper (Fig. 7) the shield 38 has a slot 41 arranged to receive a hook 42 which projects from a plate 43 adjustably mounted on the end wall 31. At its opposite end the shield 38 carries a hook 44 (Fig. 8) in the form of a bent stud which extends through a slot 45 in the end wall 30 of the hopper and has an upturned threaded portion 44a adjustably held in a slot 46 in a mounting bracket 47 by means of a nut 48. It will be evident that by means of the adjustable end connections of the shield, the size of the openings 40 may be regulated to control the rate at which feed reaches the conveying chain 35, which in turn controls the rate at which the feed is circulated through the system.

At its discharge end the hopper 19 has a tube 49 (Fig. 8) in which an observation port 50 is formed. The tube 49 is welded in place in the discharge opening 37 in the end wall 30 so that the conveyor chain 35, removing feed from the hopper 19 through the opening 37, passes through the tube 49. The level of feed in the tube 49, as seen through the port 50, will indicate the level of feed in the pickup zone 34 under the shield 38. If a faster discharge of feed is desired, the shield 38 may be raised to increase the level of the feed at the pickup zone. A partial sleeve 52 is rotatably mounted on the tube 48. This sleeve may be rotated so that the port 50 is covered after the discharge rate of the conveyor has been observed and the level of feed has been regulated.

The endless chain 35 of the conveyor 20 is made up of a plurality of steel rods 55 (Figs. 14 and 15) each of which has a segmental spherical head 56 pivotally engaged in an opening in a hardened steel, annular insert 57 which is secured in a spool 59. As seen in Figs. 14 and 16, each spool 59 is made up of two half-spools 60 secured together by machine screws 61. Each spool 59 acts as a conveyor flight or blade and the face 62 of each spool provides a contact surface which engages the feed and moves it through the conveying system.

The conveyor drive mechanism 21 comprises a sprocket 65 (Fig. 5) which is in driving engagement with the chain 35 and is keyed to the end of a shaft 67 inside a housing 68. The shaft 67 extends through the housing 68 and into a speed reducer 69 (Fig. 3) in which it is connected to a shaft 70 which is driven through a V-belt drive 71 from an electric motor 72. Inside the housing 68, the chain 35 is trained around an idler pulley 73 (Fig. 5) and around a guide pulley 74 which is integrally formed on the sprocket 65, as seen in Fig. 18. The idler pulley 73 is rotatably mounted on a pin 75 (Fig. 5) carried by a bracket 76 which is suspended in the housing 68 by a cable 78. The cable 78 extends through an opening 80 (Fig. 4) in the housing 68 to the exterior thereof and is tensioned by a spring 81 (Fig. 4). Any slack that develops in the chain 35 is automatically taken up by the tension spring 81. If the amount of slack becomes too great or, if the chain should break, the tensioned cable 78 (Fig. 5) will draw the bracket 76 upwardly against one side of a lever 82 which is pivotally mounted on a pin 83 in the housing 68. A mercury switch 84 is mounted on the other side of the lever 82 and, when the bracket 76 contacts the lever 82, the lever 82 is pivoted and the mercury switch 84 is tilted to open the electric circuit in which the motor 72 is electrically connected. Therefore, if the chain 35 breaks or excessive slack develops in the chain 35, the conveyor will be stopped automatically.

From the time a quantity of feed is taken from the hopper 19 by the conveyor 20 for distribution through the system until the time the undistributed portion of the feed is returned to the hopper, the feed travels in a closed conduit in which the feed is protected from dirt, litter, and other foreign matter. In Figs. 3 and 4, it will be seen that the feed is moved toward the left, out of the hopper 19, into the tubular passage provided by the connected tubes 49 and 85 and then into an elbow 87. While in the elbow, the feed is moved along a passage formed between the inner wall 90 (Fig. 11) of the casing of the elbow and the periphery of an idler pulley 93 rotatably journaled in the casing. Upon leaving the elbow 87, the feed is pushed through a connector tube 85a (Fig. 3) and into a conduit 88 which is formed in the trough 22 and which is provided with discharge openings arranged to direct feed downwardly into the bottom of the trough. After a supply of feed is deposited into the first trough 22, the conveyor 20 continues to move additional feed through the remainder of the closed circuit, which is made up of interconnected tubes 85, elbows 87 and troughs 22. When all the troughs have been filled the residual feed is moved through the housing 68 and returned to the hopper 19.

In the present invention the feeding trough 22 is of an improved construction which permits the use of one wall of the trough to form a portion of the conduit 88 from which the feed is distributed to the trough. The formation of the conduit adjacent one wall of the trough also assures a maximum amount of central feeding space in which the chickens may feed without being injured by the moving members of the conveyor 20. Each trough 22 (Fig. 9) comprises a central body portion 94, a left hand end closure 95, and a right-hand end closure 96. The body portion 94 is an elongated member having a sloping front wall 99 (Fig. 13) provided at its upper edge with an inturned beaded flange 98, a bottom wall 100 and an inclined rear wall 101. The rear wall 101 has a hooked upper edge 102 and an arcuate concave recess 103 formed in the wall and extending the entire length of the wall. A generally semi-cylindrical cover member 104 is disposed inside each body portion 94 in a position to cooperate with the recess 103 to define the conduit 88 which is provided in each trough for distributing feed downwardly into the trough. The cover member 104 has an upper, radially directed rigid lip 105 frictionally gripped in the hooked edge 102 of the rear wall and a lower, radially directed lip 109 that is engaged and held by the recessed end portions 106 of a plurality of clips 107. Each clip 107 lies against the inside wall of the trough body 94 and has a flat end portion 108 abutting the inturned beaded flange 98. The recessed end portions 106 hold the lower lip 109 of the cover member 104 spaced from the rear wall 101 to define a passage 110 through which feed passes downwardly to the trough 22. It is to be particularly noted that the lower edge of the lip 109 determines the depth of feed in the trough. When the feed builds up in the trough 22 to the height of this lower edge, no more feed enters the trough. As the feed is removed from the trough by the poultry, more feed is automatically delivered into the trough.

A left-hand end closure member 95 is shown in Fig. 12. This member comprises an end plate 112 secured, as by welding, inside a stirrup 113 by which the trough may be suspended at a desire distance above ground. The plate 112 has a cut-out portion 114 (Fig. 13) formed on the arc of a circle to receive a connector tube 115 (Fig. 12) which is welded to the edge of the plate 112 at the edge of the cut-out portion. When in welded position, the connector tube 115 provides a connecting conduit between the feed dispensing conduit 88 in the trough and an adjacent connector tube 85 (Fig. 3) of the closed conveying circuit. To establish means for properly locating the end closure member 95 and the trough body 94, the connector tube 115 (Fig. 12) is provided with a slot 116 which extends along the entire length of the tube 115 and is arranged to receive the hooked upper edge 102 of the conduit 88. As best seen in Fig. 12, the connector tube 115 has a short slot 119 and a cut-out portion 120 near one end. The stirrup 113 is formed to replace substantially all of this cut-out portion 120 except a small portion which defines a second slot 122. In assembling the trough, the end of the body portion 94 is slid into the stirrup 113 until the end edge of the body portion abuts the plate 112. The slot 119 of the connector tube receives the radial lip 109 of the cover member 104 and the slot 122 receives the rear wall 101. A machine screw 125 (Fig. 9) extends through the stirrup and engages the front wall 99 of the trough 22, locking the body portion 94 to the left-hand end closure member 95.

The right-hand end closure member 96 (Fig. 9) is identical to the left-hand closure member 95 except that the connector tube 115' of the member 96 extends in an opposite direction so that the slotted end of the tube is facing inwardly to receive the body portion 94 of the trough.

Each stirrup 113 has two longitudinally aligned holes 126 through which the bolts 125 extend. In Fig. 9 a trough 22 is illustrated wherein only one length of body member 94 is secured between the end closures 95 and 96. If a longer trough is desired, two or more members 94 may be disposed in end-to-end abutting relation so that bolts 125 extending through the holes 126 in the stirrups will lock the adjacent ends of two members 94 together. Since the troughs are several feet in length, one or more stirrups 113, without the transverse plate 112, may be needed to support the trough intermediate its ends.

A feed agitating mechanism 140 (Figs. 5 and 6) is mounted inside the hopper 19 to prevent accumulations of feed on the upper portions of the hopper and to keep the feed around the pickup zone from forming a bridge over the shield 38. The agitating mechanism comprises a yoke 141 pivotally mounted near its free upper ends 142 on the opposite side walls of the hopper 19. A bar 144 is pivotally connected intermediate its ends to upstanding ears 145 of the yoke 141. The bar 144 extends through suitable openings in the end wall 31 of the hopper and in the housing 68 and is pivotally connected at 147 to a stub shaft 148 which is rigidly secured to and projects from the guide pulley 74. The stub shaft 148 is parallel to the shaft 67 of the pulley 74 but is offset therefrom so that, when the pulley 74 is rotated, the stub shaft 148 moves in a circular path and reciprocates the bar 144. The feed is agitated by arms 150 which extend downwardly from the bar 144 to a position on each side of the shield 38, as seen in Fig. 6, and the arms on each side of the shield are connected by longitudinal rods 151 (Fig. 5). Since this agitating mechanism is continuously in operation, the feed is maintained in a loose condition so that it can flow freely into the pickup zone 34.

In operation, a supply of feed is deposited in the hopper 19. A portion of the feed immediately gravitates to the bottom of the hopper where some of it passes through the restricted openings 40 between the side edges of the shield 38 and the hopper walls to accumulate in the pickup zone 34. The remaining feed is held above the shield 38 and is continuously agitated by the agitator 140. As the flights of the endless conveyor 20 contact the feed in the pickup zone and move it out of the hopper, a fresh supply of feed passes through the restricted opening into the pickup zone. Since the level of feed maintained in the conveyor system is dependent on the speed at which the pickup zone is replenished, it will be evident that, by adjusting the position of the shield 38 to vary the size of the restricted opening the level of feed in the conveyor system may be accurately controlled.

The level of the feed in each trough is automatically maintained at the level of the lower edge of the lip 109 in the cover member 104 of the feed distributing conduit 88. Feed that is not discharged immediately into a trough is carried around the circuit until it escapes into one of the troughs.

From the foregoing description it will be apparent that the present invention provides an efficient and economical poultry feeder. The unique design of the feeding troughs not only protects the poultry from injury by the moving conveyor but also assures an adequate constant level of feed in the trough. Since the conveying system is entirely closed except for the opening in the supply hopper and the bottom discharge slots in the trough, it is impossible for the fresh feed to become contaminated. Accordingly, there is no chance for disease to be spread through the feed and, additionally, there is no necessity for cleaning the conveyor which handles only fresh feed.

The use of a fabricated feeding trough which can be readily assembled in various lengths and the use of elbows, that operate equally well in a horizontal or in a vertical position, makes possible a flexibility of installation not attainable heretofore in poultry feeder systems.

It will be understood that modifications and variations of the disclosed embodiment of the invention may be resorted to without departing from the scope of the novel concepts of the invention.

Having thus described our invention, what we claim as new and desire to protect by Letters Patent is:

1. A poultry feeder comprising a trough having a bottom wall and a side wall, a semi-cylindrical cover extending longitudinally in said trough above said bottom wall and cooperating with said side wall to define a conduit having a downwardly directed discharge opening therein, and a conveying member movable through said conduit and arranged to urge feed to said opening for discharge downwardly along said side wall.

2. A poultry feeder comprising a trough having an inclined side wall, a feed conveying member movable through said trough, a cover enclosing said conveying member and cooperating with said side wall to define a conduit along which feed is moved by said conveying member, said cover being arranged to define discharge ports in the lower surface of said conduit through which feed is delivered to said trough.

3. A poultry feeder comprising a trough having a bottom wall and a slanted side wall, said side wall having a curved recess formed longitudinally therein at a point spaced above and parallel to said bottom wall, a generally semi-cylindrical cover mounted in said trough adjacent the curved recess and cooperating therewith to define a conduit having an open slot through which feed is discharged to the trough, a conveying member movable through said conduit, and spaced flights carried by said conveying member.

4. A poultry feeder comprising a trough having a bottom wall and a slanted side wall, means cooperating with said slanted side wall to form a supply conduit disposed longitudinally in said trough and spaced above the bottom wall, said supply conduit having an opening in its lower surface for discharging feed downwardly along said side wall to said bottom wall, said opening being positioned a predetermined distance above said bottom wall and being arranged to be closed by the build-up of feed along said slanted wall thereby to maintain the quantity of feed in the trough at a level determined by the height of said feed opening above said bottom wall.

5. A poultry feeder comprising an elongated trough having open ends and upright side walls, one of said side walls having a segmental cylindrical recess extending longitudinally of said trough, a closure member removably connected to each end of said trough, a segmental cylindrical member cooperating with said recess to definite a conduit, and a generally tubular socket formed in each end closure member affording a passage therethrough, the wall of each socket member having longitudinal slots adapted to receive the end portion of said one wall of said trough and the end portion of said segmental cylindrical member to orient said trough and said conduit relative to said socket.

6. A poultry feed trough comprising a bottom wall, a side wall projecting upwardly from one marginal edge of said bottom wall, a cover extending longitudinally in said trough above said bottom wall and cooperating with said side wall to define a conduit for dry feed, means defining a discharge passage opening downwardly from said conduit, a conveying member movable longitudinally of said conduit for moving said dry feed, and means for moving said conveying member.

7. A poultry feed trough comprising a bottom wall, side walls projecting upwardly from said bottom wall, one of said side walls having a longitudinal recess therein spaced above said bottom wall, a cover cooperating with the recess in said one side wall to define a longitudinal conduit for conveying dry feed, a conveying member movable longitudinally of said conduit for moving said dry feed, and means for moving said conveying member.

8. A poultry feeder comprising a trough having an upwardly projecting side wall, means mounted in said trough on said side wall and cooperating therewith to define a conduit for dry feed, said conduit having a discharge opening therein leading into the trough, a conveyor member within said conduit and movable longitudinally thereof for advancing dry feed therein, and means operatively associated with said conveyor member for moving said conveyor member longitudinally of the conduit.

9. A poultry feeder comprising a trough having an upwardly projecting side wall, means mounted on said side wall cooperating therewith and defining a conduit for dry feed, said conduit having a discharge opening therein leading into the trough, a conveyor member within said conduit and movable longitudinally thereof for advancing dry feed therein, and means operatively associated with said conveyor member for moving said conveyor member longitudinally of the conduit.

References Cited in the file of this patent

UNITED STATES PATENTS

| | | |
|---|---|---|
| 1,422,900 | Strong | July 18, 1922 |
| 1,443,659 | Stephen | Jan. 30, 1923 |
| 1,896,615 | Gibbs | Feb. 7, 1933 |
| 1,992,072 | Helmick | Feb. 19, 1935 |
| 2,244,442 | Blauvelt | June 3, 1941 |
| 2,515,455 | Lipton | July 18, 1950 |
| 2,539,299 | Duhmert | Jan. 23, 1951 |
| 2,563,321 | Dugan | Aug. 7, 1951 |
| 2,591,609 | Roberts et al. | Apr. 1, 1952 |
| 2,640,463 | Kitson | June 2, 1953 |
| 2,646,023 | Virgil | July 21, 1953 |
| 2,652,808 | Wagner | Sept. 22, 1953 |
| 2,671,429 | Hart | Mar. 9, 1954 |
| 2,681,639 | Littlefield | June 22, 1954 |
| 2,683,439 | Markey | July 13, 1954 |